Sept. 20, 1938.　　　　C. C. BENNETT　　　　2,130,833
HEAVY DUTY DYNAMOMETER
Filed Dec. 30, 1936　　　　3 Sheets-Sheet 1
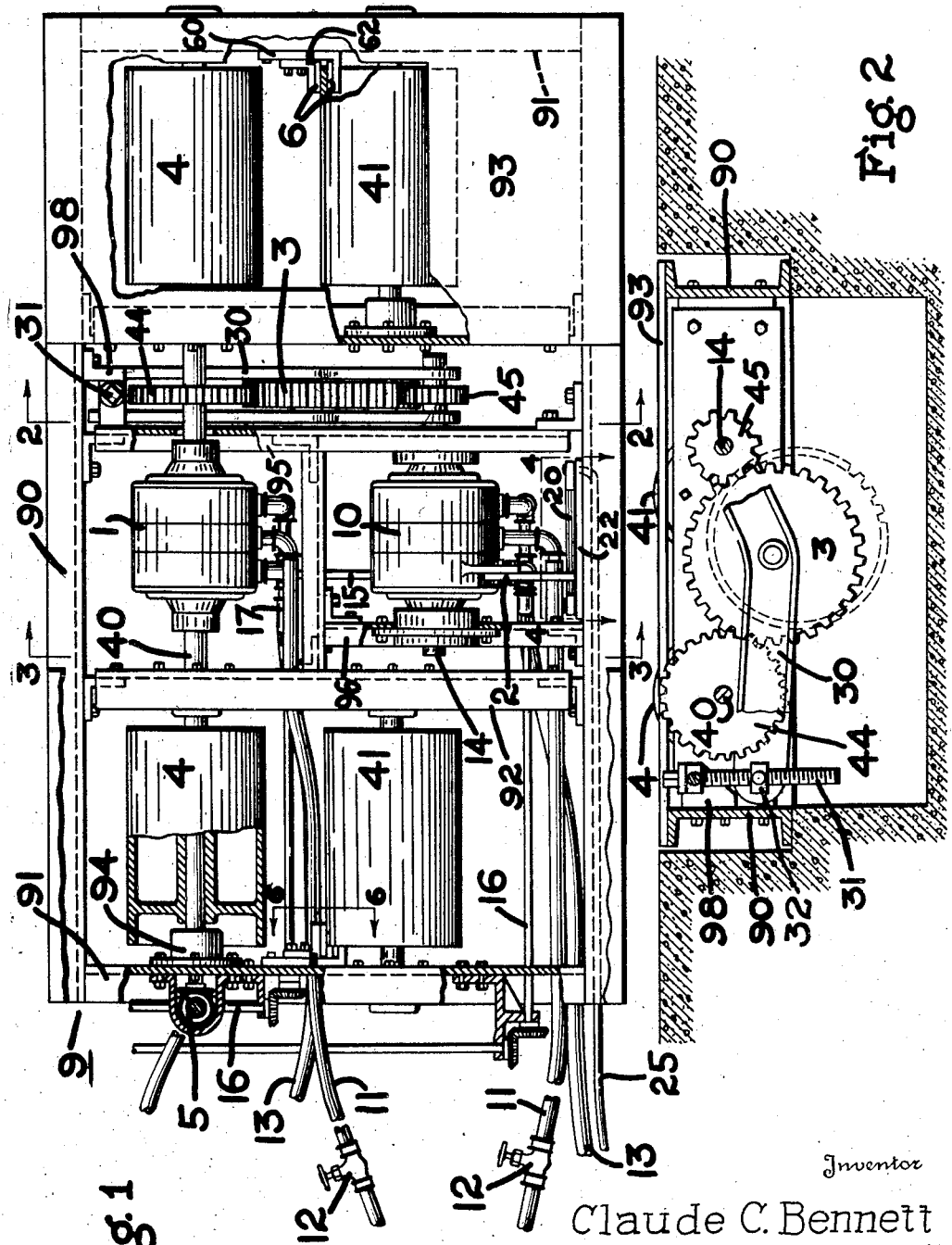
Inventor
Claude C. Bennett
By Charles L. Reynolds
Attorney Sept. 20, 1938.  C. C. BENNETT  2,130,833
HEAVY DUTY DYNAMOMETER
Filed Dec. 30, 1936  3 Sheets-Sheet 2

Inventor
Claude C. Bennett
By Charles L. Reynolds
Attorney

Sept. 20, 1938.     C. C. BENNETT     2,130,833
HEAVY DUTY DYNAMOMETER
Filed Dec. 30, 1936     3 Sheets-Sheet 3
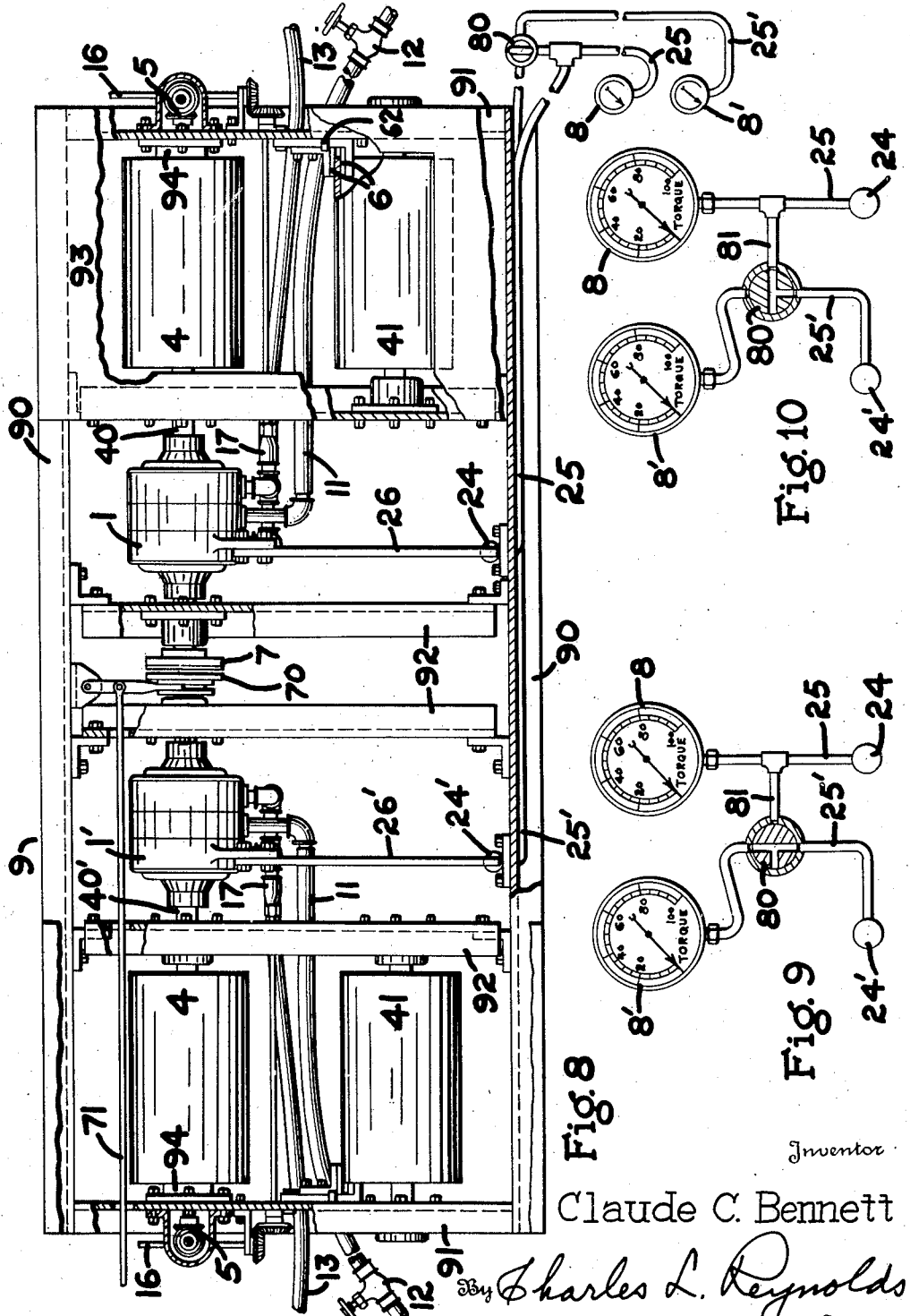

Patented Sept. 20, 1938

2,130,833

UNITED STATES PATENT OFFICE 2,130,833

HEAVY-DUTY DYNAMOMETER

Claude C. Bennett, South Bend, Ind., assignor to A. E. Feragen, Inc., Seattle, Wash., a corporation of Washington Application December 30, 1936, Serial No. 118,187

15 Claims. (Cl. 265—24)

My invention relates to machines for testing the power of automobile engines. Such a device may incorporate an hydraulic absorption dynamometer, of the general type shown in my application Serial No. 84,273, filed June 9, 1936.

In such machines the automobile engine is usually tested while in place in the car, by driving the car upon a stand or frame, the rear or driving wheels resting upon rolls that are caused to rotate by the action of the driving wheels of the automobile upon the rolls, as the engine turns these wheels. The dynamometer is normally mounted upon the shaft which carries these rolls, and in such a location is generally immediately beneath the differential of the automobile. As a result the size of the dynamometer is limited by the clearance of the lowest-hung differential casing of all automobiles to be tested, and by the spacing of the wheels of the automobile, the supporting framework and the like. Within such limits it is not possible to employ a large dynamometer in machines for general use on various makes of automobiles. On some installations, particularly for large and powerful cars, busses, or trucks, it has been found that a single dynamometer of the maximum size which can be installed in the permitted space will not absorb sufficient power, or will be overworked in so doing.

Some trucks have gear reductions as high as 20 to 1, and it may be desired to test the power of the truck engine at gear reductions such that, even with maximum engine speed, the wheels are turning very slowly, and with normal engine speed, they turn even more slowly. Since an hydraulic absorption dynamometer, and indeed, other types of dynamometers, do not operate sufficiently nor register accurately at such slow speeds, it is necessary to provide for application of the power from the wheels to the dynamometer, in such cases, in a way which will produce proper efficiency and accurate indications. At the same time the device must be such as will give proper indications, and be satisfactory for use, with less powerful or faster vehicles.

Some busses are of a type wherein the driving wheels at one side are driven by one engine, and the wheels at the other side are driven by a separate engine; such busses are known as twin coaches. It is difficult to synchronize the speeds and power delivery of the two engines, and a dynamometer is very helpful in accomplishing this, or in determining when it has been accomplished, but this requires a special type of dynamometer and dynamometer drive—one wherein the two engines can be tested independently and jointly, at will, and as such engines and busses are large and powerful, the same problems as are encountered with other large and powerful vehicles are met with here, in addition to the special problem mentioned.

Accordingly, it is an object of my present invention to devise a dynamometer and associated mechanism adapted to each (and preferably to all) of these special conditions—one which can be used for light work, on pleasure cars or light trucks, but which is adapted to accomplish the testing of large, heavy and powerful vehicles when necessary, within the limitations of space, peculiar characteristics of drive, etc., to be met with in any given vehicle.

More specifically it is an object to provide a machine for such testing operations embodying dual dynamometers, so connected and independently controlled that one may be used alone and the other will be inoperative or will absorb no power, or, in case of necessity, both may be employed, their effect being cumulative, and by means of which mechanism any combination of the two or any reasonable proportional distribution of the power between the two dynamometers may be achieved, and which will yet in all cases indicate the total power absorbed by the one or by any combination of both the dynamometers.

It is another object to couple such dual dynamometers to each other, or to the wheel-contacting rolls, in such a way that, for very slow speeds of the wheel, the dynamometers, or at least the operative one thereof, will be driven at a speed above its lower limit of efficiency, whereby an accurate indication of the engine's power may be obtained.

Still a further object is to provide such a dynamometer wherein a twin coach drive may be tested properly, each drive individually or the two jointly.

It is a further object to provide such a dynamometer having convenient and simple control means and coupling means for the dynamometer units, which will absorb but little or no power, and which will therefore not appreciably affect the indications given by the dynamometers.

A further object is to provide such a machine of a type which can be installed in a pit or at floor level, if desired.

My invention comprises the novel power tester, as shown in the accompanying drawings, and as will be hereinafter more fully disclosed and claimed.

In the accompanying drawings I have shown my invention embodied in illustrative forms.

Figure 1 is a general plan view of the present invention, in one embodiment.

Figure 2 is a section on line 2—2 of Figure 1.

Figure 8 is a plan view of a modified form, particularly adapted to the testing of twin coaches, the indicating mechanism being diagrammatically shown.

Figure 9 is an enlarged diagrammatic elevation of the dual indicators of this form of dynamometer, arranged for independent indications, and Figure 10 is a similar view, arranged for joint indications on a single gauge.

Figure 3:
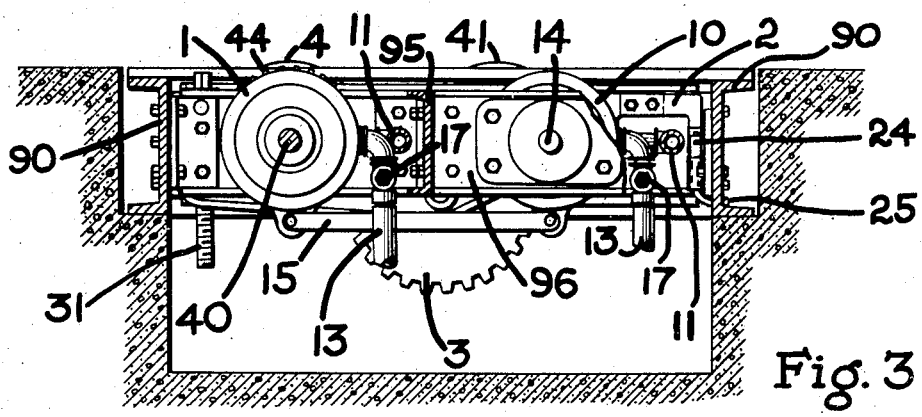
Figure 3 is a section on line 3—3 of Figure 1.

Referring first to Figures 1 to 7 inclusive, the machine is supported in suitable framework, generally indicated at 9, and consisting of transverse bars 90, end bars 91, and intermediate connecting bars 92 suitably arranged for adjustment with relation to the remainder of the frame. Cover plates 93 may be employed, where necessary.

Journaled in bearings 94 on the end bars 91 is a roll shaft 40, whereon are secured rolls 4, on a level with the top of the frame or projecting slightly thereabove and above the cover plate 93, to receive and support the driving wheels of an automobile. Parallel to each of these rolls 4 is a similar roll 41, journaled between each end bar 91 and the adjacent intermediate bar 92, the rolls 41 cooperating with the rolls 4 to cradle the automobile driving wheels.

Mounted upon the roll shaft 40 is a dynamometer, which is or may be of the type disclosed in greater detail in my application Serial No. 84,273, referred to above. The principles of such dynamometers are well-known in the art, and hence require no detailed explanation. This includes a rotor (not shown) which is fast upon the shaft 40, and a casing 1 which is hung upon the shaft 40, and which tends to oscillate because of torque transmitted thereto through a hydraulic medium interposed between the rotor on the shaft and the casing 1. The casing may be filled with liquid or empty, or filled to an intermediate degree, and liquid is supplied to the interior of the dynamometer by a hose or similar connection, indicated at 11, and controlled by a valve 12, and the liquid is discharged from a hose or similar connection indicated at 13, and controlled by a valve 17, close to the dynamometer, and operable from a distance by control means 16.

Figure 4:
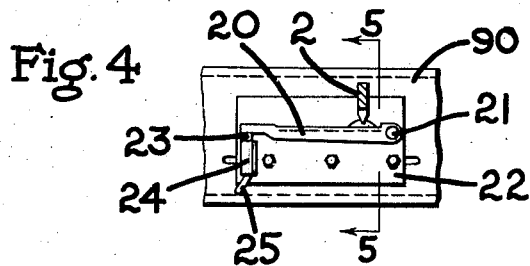
Figure 4 is an elevation taken from the viewpoint indicated by the line 4—4 of Figure 1, and indicating a part of the torque indicating mechanism.
Figure 5:
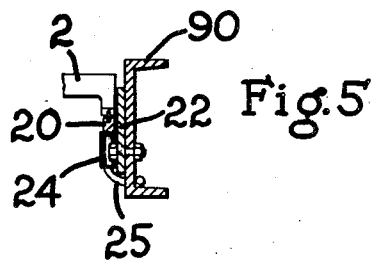
Figure 5 is a transverse section therethrough on the line indicated at 5—5 of Figure 4.

The machine thus far described, with suitable indicating mechanism, may be found sufficient for the normal run of testing operations, but it will not have sufficient capacity for all jobs that it may be called upon to do. Therefore to increase its capacity I provide a second dynamometer unit 10, similar to the dynamometer indicated at 1. This dynamometer 10 may be carried by a shaft 14 journaled in frame members 95 and 96, so that it is free to oscillate with respect to its shaft 14. The two casings 1 and 10 are connected together by a link 15 so that as either one oscillates it effects oscillation of the other, and the two casings thus joined are provided with a torque arm connected to a suitable indicating device. For example, the casing 10 may be provided with a torque arm 2 which, to increase its leverage yet to keep the torque arm short, may bear, as shown in Figures 4 and 5, upon an arm 20 at right angles to it and pivoted at 21 upon a plate 22 adjustable (to vary the effective leverage of the torque arm) along a frame member 90. The end of the arm 20 opposite its pivot bears upon a plunger 23 movable with respect to a cylinder 24, whereby pressure produced by torque acting upon the casing 1, or both casings, is transmitted through a tube or hose 25 from the pressure cylinder 24 to a suitable indicating device (not shown in Figures 1 to 7).

It will be understood that the supply of fluid to and through the casing 10 is controlled by means similar to those disclosed for the control of fluid to and through the casing 1, and indicated by the same numerals.

In order that the dynamometers may suitably cooperate, however, it is necessary that their shafts be suitably connected to rotate at the same time, but preferably at different speeds, yet it is not desirable that they be connected at all times, for when a single dynamometer only is required, the second dynamometer should be completely out of operation to absorb no power. Therefore it should be empty of liquid and should not be connected for rotation of its shaft. It does not affect the test, however, to permit its casing 10 to oscillate upon its shaft, as this will absorb no appreciable amount of power, but its shaft should not be connected for rotation. To that end I may provide a connection such as the gears 44 and 45 on the shafts 40 and 14, respectively, which gears are adapted to be connected through the intermediary of an idler gear 3. This idler gear may be in mesh at all times with the gear 45, and in order to mesh it with or to unmesh it from the gear 44 on the shaft 40 it may be journaled in arms 30 supported upon an extension of the shaft 14, and swingable by means of a screw 31 threaded in a nut 32 pivotally mounted in the arms 30. Thus by raising or lowering the arms 30 through rotation of the screw 31 the gear 3 can be meshed with the gear 44 or dropped out of mesh therewith. The entire connection may, if desired, be enclosed in a suitable casing.

The gears 44 and 45 might be equal in size, were the only requirement that of absorbing more power than could be absorbed to advantage by a single dynamometer. There is another requirement, however, that must be kept in mind, namely, that of maintaining the dynamometer turning at a speed above its lower limit of efficiency, when the rolls 4 are turning very slowly. I therefore prefer to make the gear 45 smaller than the gear 44 which drives the former, thus speeding up the dynamometer 10. Now the latter may be employed alone to determine the power developed (the dynamometer 1 being drained of liquid), and this is not objectionable for short tests, or, if the speed of the rolls 4 is sufficient, and greater absorption of power is required than can be conveniently furnished by a single dynamometer, both dynamometers, 1 and 10, may be employed simultaneously.

Figure 7:
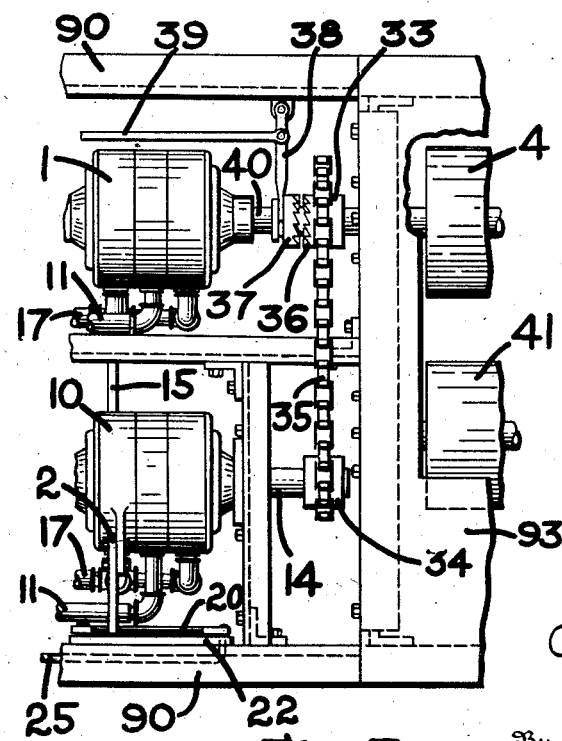
Figure 7 is a plan view of a portion of the machine, illustrating a modified form thereof.

An alternative means of connecting the two dynamometers for simultaneous drive, or for drive of the dynamometer 10 alone, is illustrated in Figure 7. Here the shaft 40 is provided with a large sprocket wheel 33, and a small sprocket wheel 34 is mounted on the shaft 14, a sprocket chain 35 connecting the two sprocket wheels, and the sprocket wheel 33 has a clutch element 36 formed thereon with which is engageable a complemental clutch element 37 controlled by a lever 38 and link 39. The sprocket wheel 33 with its clutch element 36 is loosely mounted upon the shaft 40, and the clutch element 37 is keyed to the shaft. By engagement of the two clutch elements 36 and 37 the shaft 14 is driven in unison with the shaft 40, and by disengagement of the clutch elements the shaft 40 is left free to rotate without any appreciable resistance offered by the drive connections or the dynamometer 10.

I have shown at 5 a drive connection to a revolution counter or tachometer (not shown) which will indicate, in conjunction with the torque indicated on a suitable gauge (not shown in Figures 1 to 7) actuated by the pressure cylinder 24, the amount of power absorbed in the dynamometer or dynamometers.

Figure 6:
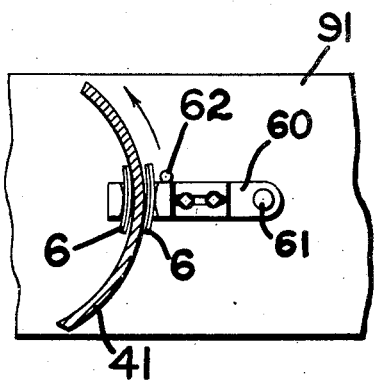
Figure 6 is a detail section of a device for preventing reverse rotation of a roll, taken on the line 6—6 of Figure 1.

In installations wherein it is not readily feasible to drive an automobile forwardly off the tester, and it is preferable that the automobile be backed off, means may be provided to lock the rolls against reverse rotation, and such means are shown in Figure 6. The rolls, of course, must be unimpeded during testing. In this figure an arm 60, pivoted upon the frame at 61, carries outer and inner shoes 6 capable of engaging the end of the rolls 41. A stop pin 62 limits swinging of the arm 60 in the direction in which the rolls 41 normally turn during a test, but when the roll is stationary the shoes 6 drop down by gravity and tend to grip the roll. The outer shoe is shown adjustable so that this grip will be automatically effected. The slight friction of the shoes as the roll rotates forwardly is negligible, or the shoe may be positively held up, out of contact with the roll. Now if there is any tendency for the roll to rotate backwardly, as would be occasioned by backing off an automobile, the shoes 6 grip tightly, and hold the roll against reverse rotation, thus permitting the automobile to back off and to come to rest upon the cover plates 93.

Referring now to Figures 8, 9 and 10, the frame and roll sets are or may be substantially identical with the structure previously described. However, the shaft connected to the driven roll 4 is not continuous through both rolls, but is broken, as indicated at 40 and 40', and a dynamometer is mounted upon each such shaft, as at 1 and 1'. The two shafts are aligned, however, and can be connected to rotate together, by the clutch 7, 70, controlled by the clutch-operating link 71 from a convenient point. Each dynamometer is provided with its individual controls, indicated by the same numerals previously employed, and each has its torque arm 26 and 26', respectively, bearing upon the plunger within the cylinder 24 or 24', from which extend the pressure conduits 25 and 25', leading to indicators to be referred to hereafter. By joining the two shafts 40 and 40' through the clutch 7, 70, and by delivering liquid to or through both dynamometers 1 and 1', their additive effect will give the total torque developed by both wheels of the vehicle. By emptying one or the other dynamometer, or by disconnecting the clutch 7, 70, the torque developed by either wheel of the vehicle, alone, may be determined.

The torque indicators 8 and 8' are set up in a convenient location, preferably where they are visible to the operator who is testing the engine or engines, and each has its pressure conduit 25 or 25', as the case may be, extending to it from the respective pressure cylinders 24 and 24'. The indicators may be any suitable type of pressure gauge, calibrated preferably in units of torque. A three-way valve 80 is connected in one of the pressure conduits, controlling a connection 81 between the two conduits 25 and 25'. With the valve 80 in the position of Figure 9, the conduits 25 and 25' are both unbroken, but are not connected, and each gauge registers the torque developed by its own dynamometer. With the valve in the position of Figure 10, the gauge 8' is inoperative, and pressure in the conduit 25' is communicated to the conduit 25, in addition to the pressure in the latter, and the gauge 8 registers the total torque developed in both dynamometers, or in that one which is operative, if one is not operating.

An arrangement such as that just described may require greater width between rolls 4, to accommodate the two dynamometers, than the arrangement first described, but the width of tread in such twin coaches is normally greater than in lighter, less powerful vehicles, hence greater width is available. The arrangement of Figure 8 may still be used with both dynamometers, clutched together, when it is necessary to provide for absorption of power, from a conventionally driven vehicle, greater than can be conveniently obtained by the use of a single dynamometer, or it can be used with one dynamometer inactive, the two shafts 40 and 40' clutched together, for lighter work.

While the invention has been described with particular reference to a few desirable embodiments thereof, it is to be understood that the disclosure is illustrative only, and that many changes may be made in the particular arrangements of parts, or in the manner in which they may be operably connected together, or optionally rendered inoperative to accomplish the desired results comprehended within the scope of this invention, without departing from the spirit of the invention as defined by the following claims.

What I claim as my invention is:

1. In a vehicle power tester, in combination with a shaft extending transversely of and beneath a pair of driving wheels, means, including rolls secured on said shaft, to support said wheels, an hydraulic absorption dynamometer operatively associated with said shaft to absorb power delivered thereto, a second hydraulic absorption dynamometer, means connecting the casings of the two dynamometers to oscillate together, means to drive the shaft of the second dynamometer from the shaft of the first dynamometer, means to control the liquid independently within each dynamometer, and means to indicate the power absorbed by both said dynamometers.

2. In a vehicle power tester, in combination with a shaft extending transversely of and beneath a pair of driving wheels, means, including rolls secured on said shaft, to support said wheels, an hydraulic absorption dynamometer operatively associated with said shaft to absorb power delivered thereto, a second hydraulic absorption dynamometer, means connecting the casings of the two dynamometers to oscillate together, means to drive the shaft of the second dynamometer from the shaft to the first dynamometer, means to control the liquid independently within each dynamometer, and a single means common to both dynamometers to indicate the power absorbed by either or both.

3. In a vehicle power tester, in combination with a shaft extending transversely of and beneath a pair of driving wheels, means, including rolls secured on said shaft, to support said wheels, an hydraulic absorption dynamometer operatively associated with said shaft to absorb power delivered thereto, a second hydraulic absorption dynamometer, means connecting the casings of the two dynamometers to oscillate together, means to drive the shaft of the second dynamometer from the shaft of the first dynamometer, and means connected to the second dynamometer to indicate the power absorbed by both.

4. In a vehicle power tester, in combination, an hydraulic absorption dynamometer including a rotative shaft and an oscillatable casing, a second similar dynamometer, means to connect the shafts of the two dynamometers for simultaneous operation, means connecting the casings of the two dynamometers to oscillate together, means common to the two dynamometers and operatively connected to one to indicate the power absorbed, and manifested by tendency of either or both of the casings to oscillate, means to control the passage of liquid through each dynamometer independently of the other, and means to rotate the shaft of one dynamometer from the engine of a vehicle being tested.

5. The combination defined by claim 4, wherein the means to connect the dynamometer shafts is connectable and disconnectable at will.

6. The combination defined by claim 4, wherein the means to connect the dynamometer shafts comprises a gear on each shaft, an idler gear movable into and from mesh with both gears, and means supporting the idler gear and movable to mesh or unmesh the idler gear at will.

7. The combination defined by claim 4, wherein the means to connect the dynamometer shafts comprises a sprocket wheel on each shaft, a chain passing thereabout, and disconnectable complemental clutch means carried by the shaft of the first dynamometer, and by one of said sprocket wheels.

8. In a vehicle power tester, in combination, a dynamometer including a rotative shaft and an oscillatable casing, a second similar dynamometer, means to connect the shafts of the two dynamometers for simultaneous rotation but at different speeds, means operatively connected to both dynamometers, and responsive to torque developed in either to indicate such torque, means to control the internal resistance to rotation in each dynamometer independently of the other, and means to rotate the shaft of one dynamometer from the engine of a vehicle being tested.

9. In a vehicle power tester, in combination, a frame, a shaft journaled therein, rolls at opposite ends of said shaft spaced to receive the driving wheels of an automobile, a roll parallel to and spaced from each of the first-mentioned rolls to cradle such driving wheels, a dynamometer carried by the shaft, disposed between the vehicle wheels, and including an oscillatable casing, means to control the torque developed in said dynamometer, a second dynamometer spaced lengthwise from the first, in the direction of the length of the automobile, and likewise including an oscillatable casing, means connecting the two casings to oscillate together, means to drive the shaft of the second dynamometer from the shaft of the first dynamometer, means to control the torque developed in the second dynamometer independently of the first, and means to indicate the torque developed in one dynamometer and/or communicated thereto from the other.

10. In a vehicle power tester, in combination, a frame, a shaft journaled therein, rolls at opposite ends of said shaft spaced to receive the driving wheels of an automobile, a roll parallel to and spaced from each of the first-mentioned rolls to cradle such driving wheels, a dynamometer carried by the shaft, disposed between the vehicle wheels, and including an oscillatable casing, means to control the torque developed in said dynamometer, a second dynamometer spaced lengthwise from the first, in the direction of the length of the automobile, and likewise including an oscillatable casing, means connecting the two casings to oscillate together, means to drive the shaft of the second dynamometer from the shaft of the first dynamometer, means to control the torque developed in the second dynamometer independently of the first, and means to indicate the torque developed in the second dynamometer and/or communicated thereto from the first.

11. In a vehicle power tester, two rolls spaced apart to support opposite driving wheels of a vehicle to be tested, two dynamometers, means operatively connected with the latter for indicating torque developed therein, and means to connect both dynamometers for simultaneous operation by the two rolls or to connect one only.

12. In a vehicle power tester, two rolls spaced apart to receive the opposite driving wheels of a vehicle to be tested, and to be rotated by the latter, two dynamometers, means operatively connected with both dynamometers to indicate the torque developed in one thereof or in both; means to connect both such dynamometers for rotation by a given roll, or to disconnect one dynamometer from such roll.

13. In a vehicle power tester, two shafts, two dynamometers, one on each shaft, means to rotate the shafts in accordance with power delivered from the driving wheels of a vehicle to be tested, means to indicate the torque developed in one or alternatively in both dynamometers, and means operable to connect said shafts for simultaneous rotation, or to disconnect said shafts to determine the torque developed in a single dynamometer.

14. In a vehicle power tester, in combination, a dynamometer including a rotative shaft and an oscillatable casing, a second similar dynamometer, means to connect the shafts of the two dynamometers for simultaneous rotation, or to disconnect them for independent rotation, means operatively connected to both dynamometers, and responsive to torque developed in either to indicate such torque, means to control the internal resistance to rotation in each dynamometer independently of the other, and means to rotate the shaft of each dynamometer from a different one of the opposite driving wheels of a vehicle being tested.

15. In a vehicle power tester, in combination, a dynamometer including a rotative shaft and an oscillatable casing, a second similar dynamometer, means to connect the two shafts for simultaneous rotation, or to disconnect them for independent rotation, indicating means including two pressure gauges, one connected to each dynamometer, and each responsive to torque developed in the corresponding dynamometer to indicate such torque, valve means to connect the two indicating means to register at will on one gauge alone the combined torque of the two dynamometers, means to control the internal resistance to rotation in each dynamometer independently of the other, and means to rotate each shaft from a different one of the opposite wheels of a vehicle being tested.

CLAUDE C. BENNETT.

CERTIFICATE OF CORRECTION.

Patent No. 2,130,833.  September 20, 1938.

CLAUDE C. BENNETT.

It is hereby certified that error appears in the printed specification of the above numbered patent requiring correction as follows: Page 1, first column, line 35, for "absorpition" read absorption; line 37, for "sufficiently" read efficiently; page 3, second column, line 59, claim 2, for the word "to" read of; and that the said Letters Patent should be read with this correction therein that the same may conform to the record of the case in the Patent Office.

Signed and sealed this 7th day of November, A. D. 1939.

(Seal)

Henry Van Arsdale,
Acting Commissioner of Patents.